United States Patent
Galdun

(10) Patent No.: US 10,617,247 B1
(45) Date of Patent: Apr. 14, 2020

(54) WRIST WORN CUP HOLDER

(71) Applicant: John Galdun, Middletown, NY (US)

(72) Inventor: John Galdun, Middletown, NY (US)

( * ) Notice: Subject to any disclaimer, the term of this patent is extended or adjusted under 35 U.S.C. 154(b) by 0 days.

(21) Appl. No.: 16/242,130

(22) Filed: Jan. 8, 2019

(51) Int. Cl.
*A47G 23/00* (2006.01)
*A47G 23/02* (2006.01)
*F16M 13/04* (2006.01)
*A47G 23/06* (2006.01)
*A45F 5/10* (2006.01)

(52) U.S. Cl.
CPC ......... *A47G 23/0216* (2013.01); *F16M 13/04* (2013.01); *A45F 5/102* (2013.01); *A47G 23/0641* (2013.01)

(58) Field of Classification Search
CPC ........... A47G 23/0216; A47G 23/0641; F16M 13/04; A45F 5/102
USPC .......................................................... 224/219
See application file for complete search history.

(56) References Cited

U.S. PATENT DOCUMENTS

| | | | |
|---|---|---|---|
| D217,828 S | 6/1970 | Hilliard | |
| 4,220,302 A * | 9/1980 | Hampton | A61J 9/0676 224/148.6 |
| 4,736,876 A | 4/1988 | Kriss | |
| 4,974,762 A | 12/1990 | Boretsky | |
| 5,060,835 A * | 10/1991 | Payne | A45C 1/04 224/148.2 |
| 5,454,497 A | 10/1995 | Kettelson | |
| 5,566,869 A | 10/1996 | Katz | |
| 5,579,968 A | 12/1996 | Staschiak | |
| 5,862,927 A * | 1/1999 | Tebeau | A61J 9/00 215/11.1 |
| 5,890,636 A | 4/1999 | Kibbe | |
| 5,967,345 A * | 10/1999 | Subotin | A47C 7/62 211/119.007 |
| 6,000,664 A * | 12/1999 | Hood | A61J 9/0638 248/102 |
| 9,027,807 B2 * | 5/2015 | Kampas | A45F 5/00 224/148.4 |
| 9,878,350 B2 * | 1/2018 | Landy | A45D 34/00 |
| 2012/0325873 A1 | 12/2012 | Stocco | |
| 2013/0146623 A1 | 6/2013 | Murray | |

FOREIGN PATENT DOCUMENTS

WO   2013066206   5/2013

* cited by examiner

*Primary Examiner* — Peter N Helvey
(74) *Attorney, Agent, or Firm* — Kyle A. Fletcher, Esq.

(57) ABSTRACT

The wrist worn cup holder may be adapted to attach to a human extremity via an arm strap and to hold a beverage container adjacent to the human extremity via a beverage ring. The beverage ring may change its orientation relative to the arm strap by rotating at a swivel bearing as the human extremity is moved such that the beverage container remains upright. As non-limiting examples, the human extremity may be a wrist or an upper arm. Use of the wrist worn cup holder may free the user's hands for other tasks. The arm strap may comprise a stiffener for support, a flexible band for tension, and a first grip pad to prevent slippage. The flexible band may open for donning and removal. The beverage ring can comprise a second grip pad to prevent slippage of the beverage container and to prevent scratches.

18 Claims, 5 Drawing Sheets

WRIST WORN CUP HOLDER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of beverage holders, more specifically, a wrist worn cup holder.

SUMMARY OF INVENTION

The wrist worn cup holder may be adapted to attach to a human extremity via an arm strap and to hold a beverage container adjacent to the human extremity via a beverage ring. The beverage ring may change its orientation relative to the arm strap by rotating at a swivel bearing as the human extremity is moved such that the beverage container remains upright. As non-limiting examples, the human extremity may be a wrist or an upper arm. Use of the wrist worn cup holder may free the user's hands for other tasks. The arm strap may comprise a stiffener for support, a flexible band for tension, and a first grip pad to prevent slippage. The flexible band may open for donning and removal. The beverage ring can comprise a second grip pad to prevent slippage of the beverage container and to prevent scratches.

An object of the invention is to hold a beverage container adjacent to a human extremity.

Another object of the invention is to allow the beverage ring holding the beverage container to rotate relative to the arm strap that is attached to the human extremity as the human extremity is moved.

A further object of the invention is to provide for a length adjustment of the flexible band that holds the wrist worn cup holder to the human extremity.

Yet another object of the invention is to provide a stiffener and grip pad on the arm strap to support the beverage ring and to prevent slippage.

These together with additional objects, features and advantages of the wrist worn cup holder will be readily apparent to those of ordinary skill in the art upon reading the following detailed description of the presently preferred, but nonetheless illustrative, embodiments when taken in conjunction with the accompanying drawings.

In this respect, before explaining the current embodiments of the wrist worn cup holder in detail, it is to be understood that the wrist worn cup holder is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wrist worn cup holder.

It is therefore important that the claims be regarded as including such equivalent construction insofar as they do not depart from the spirit and scope of the wrist worn cup holder. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
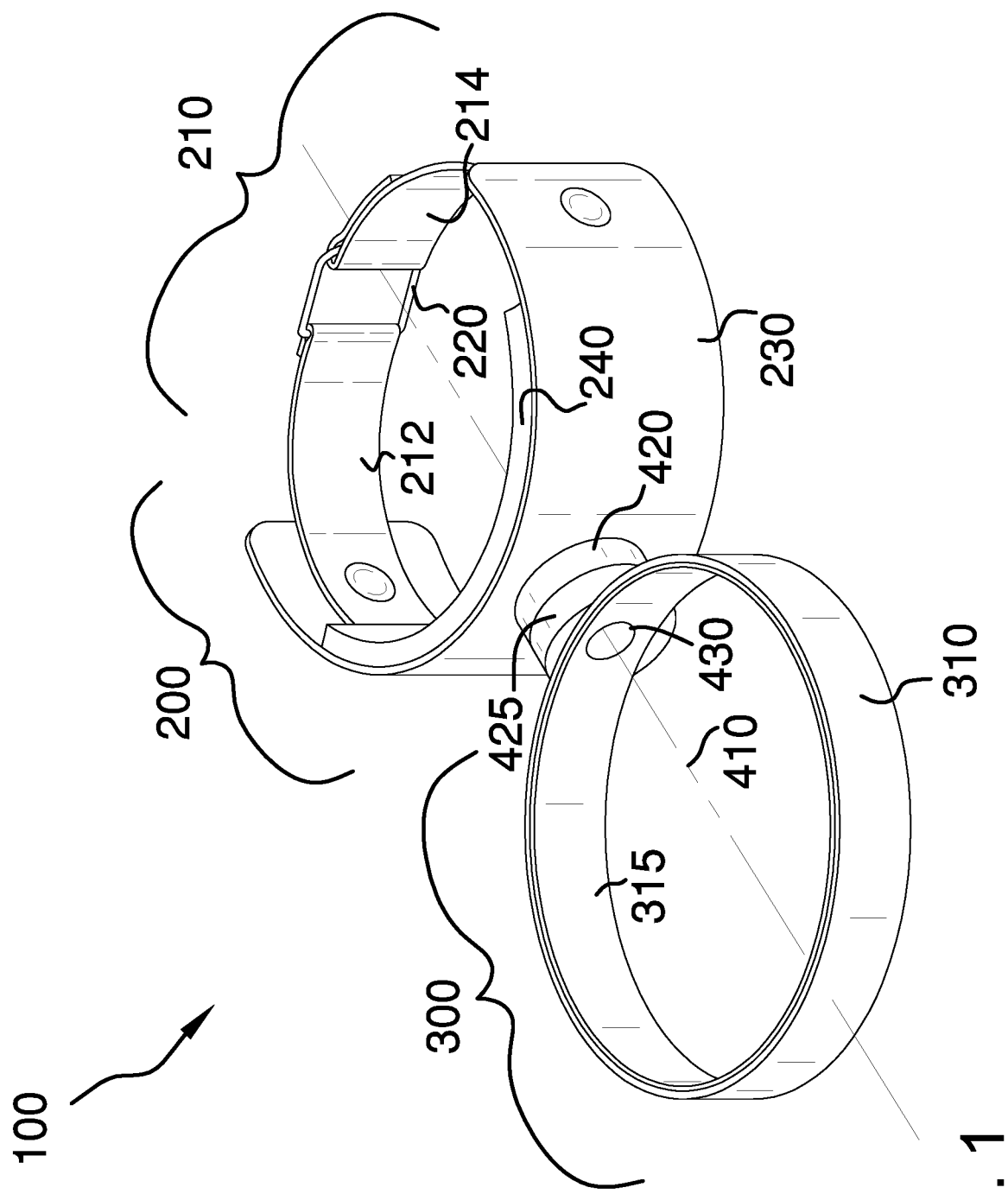
FIG. 1 is a perspective view of an embodiment of the disclosure.
Figure 2:
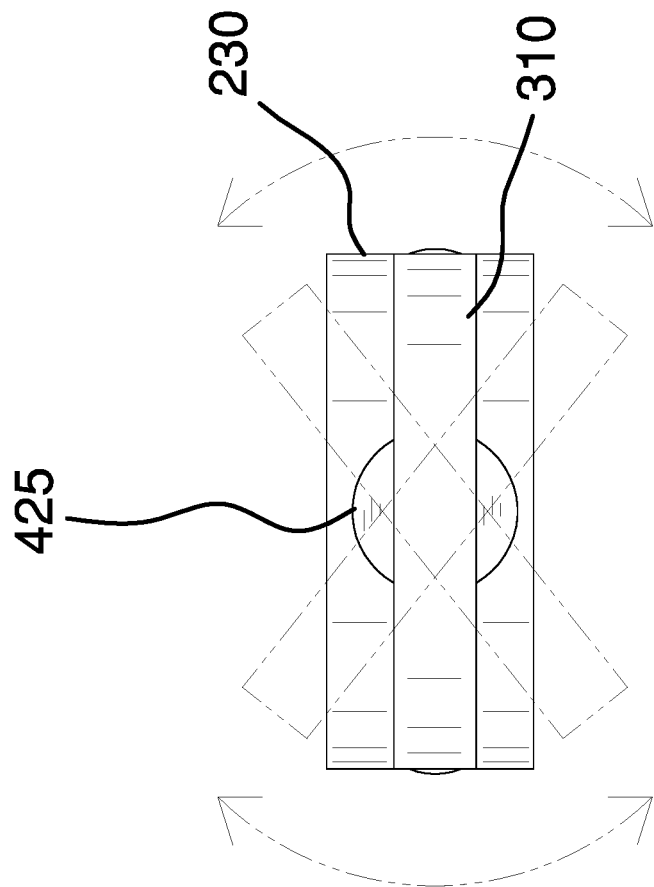
FIG. 2 is a front view of an embodiment of the disclosure illustrating multiple rotational positions of the beverage ring.
Figure 3:
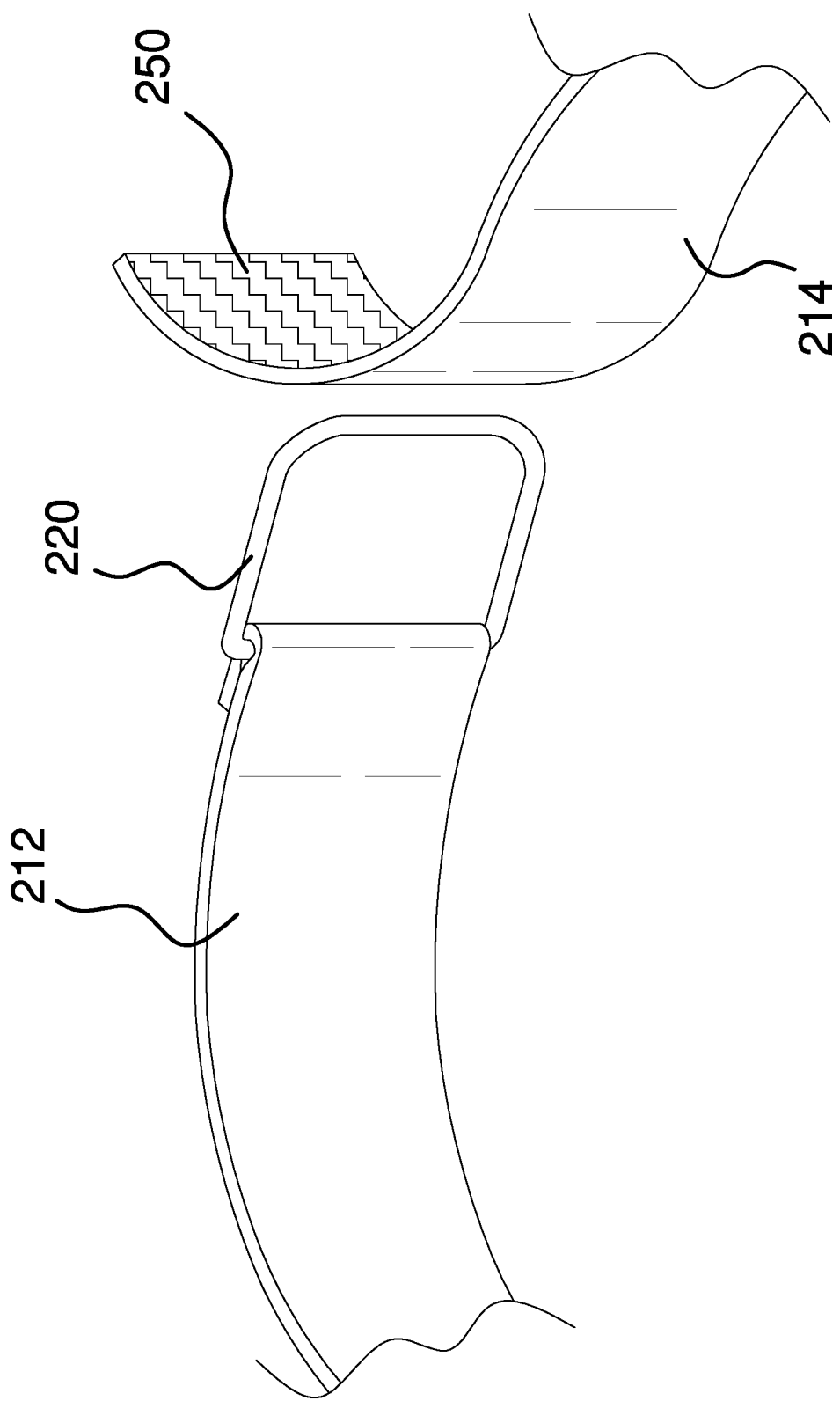
FIG. 3 is a detail view of an embodiment of the disclosure illustrating the opening of the flexible band.
Figures 4A, 4B:
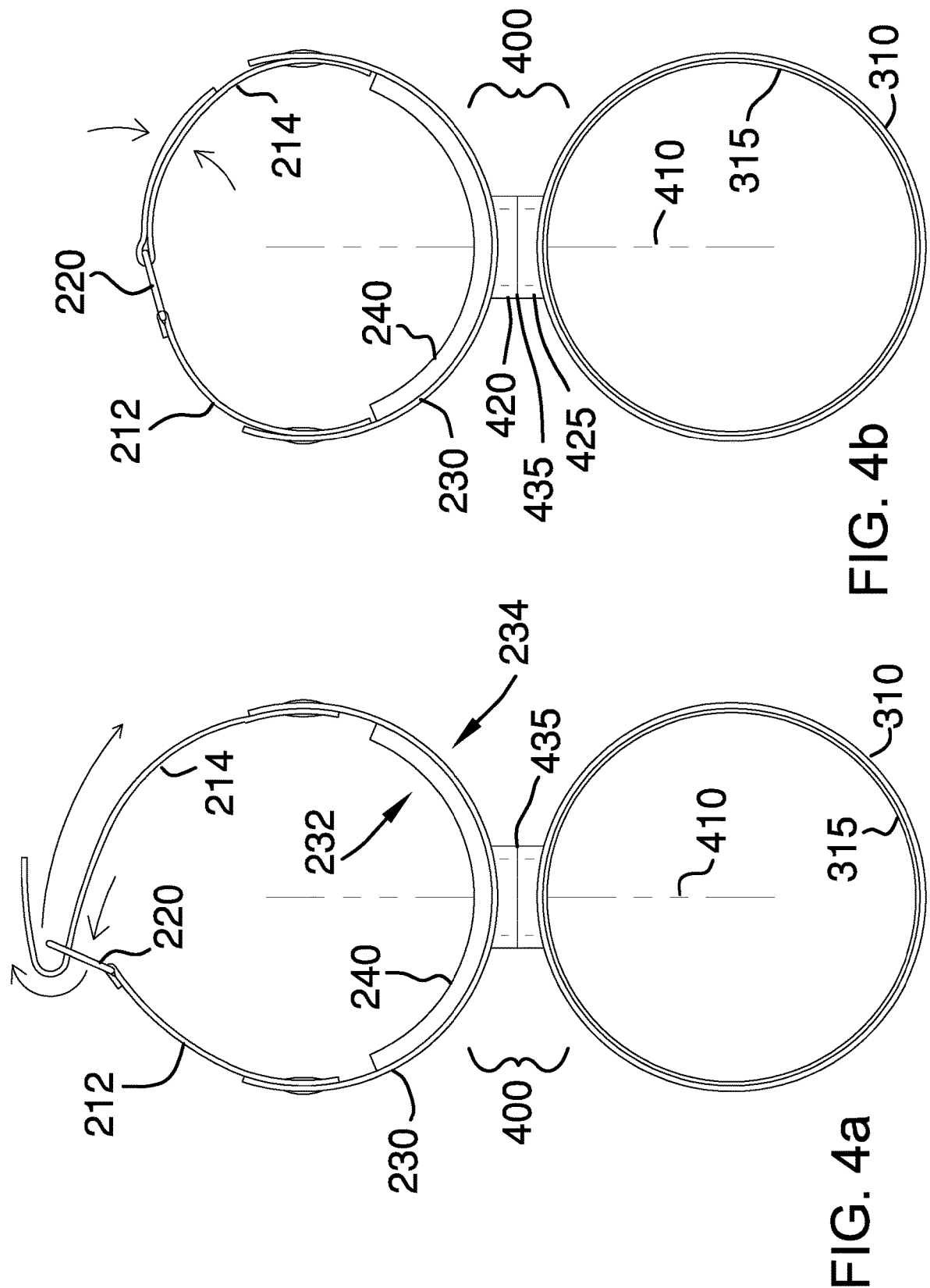
FIG. 4A is a detail view of an embodiment of the disclosure as seen from above illustrating an intermediate stage of closing the flexible band.
FIG. 4B is a detail view of an embodiment of the disclosure as seen from above illustrating the flexible band when closed.
Figure 5:
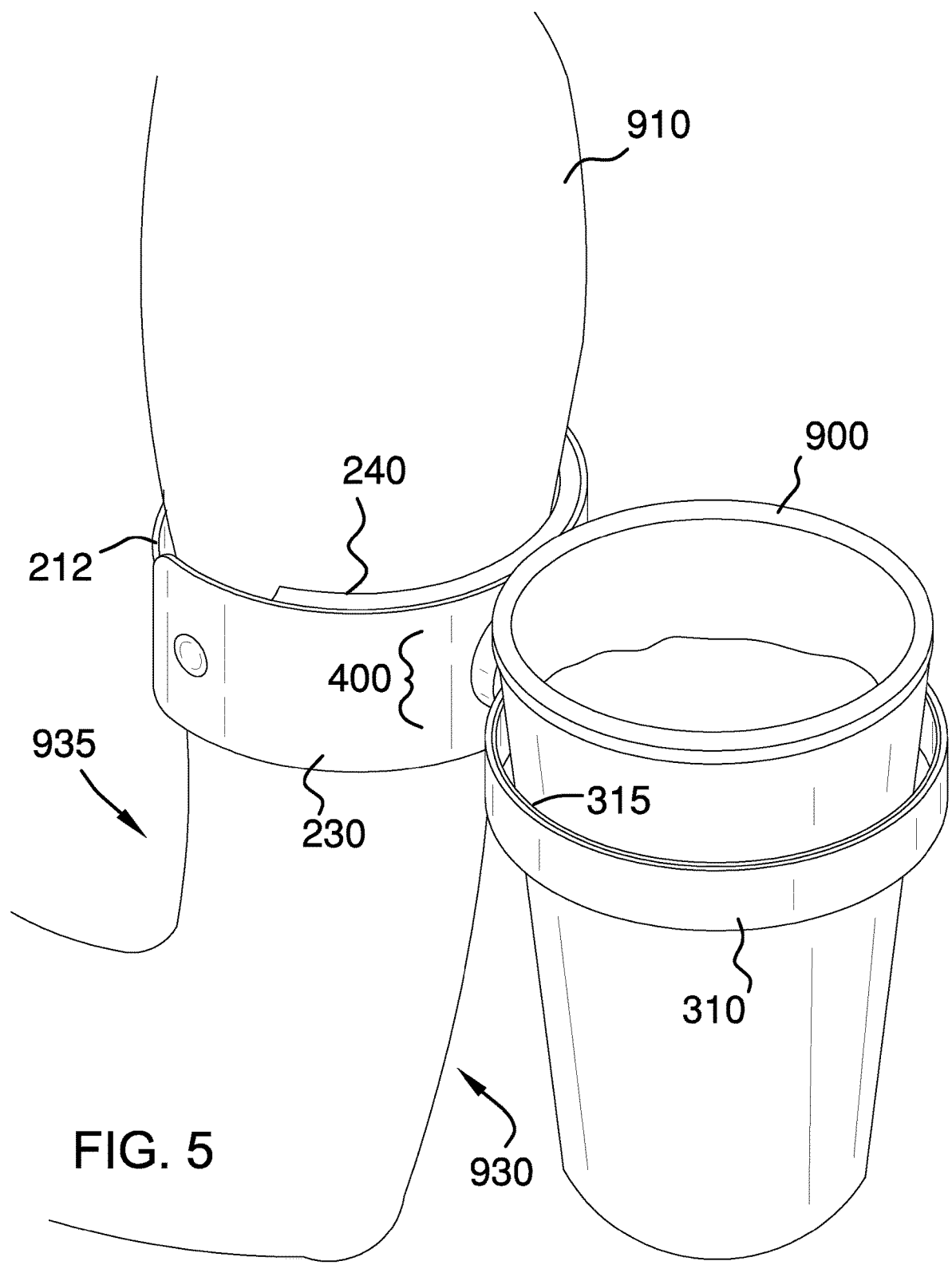
FIG. 5 is an in-use view of an embodiment of the disclosure illustrating the invention worn on an upper arm.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Detailed reference will now be made to a first potential embodiment of the disclosure, which is illustrated in FIGS. 1 through 5.

The wrist worn cup holder 100 (hereinafter invention) comprises an arm strap 200, a beverage ring 300, and a swivel bearing 400. The invention 100 may be adapted to attach to a human extremity 910 via the arm strap 200 and to hold a beverage container 900 adjacent to the human extremity 910 via the beverage ring 300. The beverage ring 300 may change its orientation relative to the arm strap 200 by rotating at the swivel bearing 400 as the human extremity 910 is moved such that the beverage container 900 remains upright. As non-limiting examples, the human extremity 910 may be a wrist or an upper arm. Use of the invention 100 may free the user's hands for other tasks.

The arm strap 200 may comprise a stiffener 230, a first grip pad 240, a flexible band 210, and a length adjuster 220. The arm strap 200 may be adapted to attach to the human extremity 910 by placing the stiffener 230 against an outside of the extremity 930 and passing the flexible band 210 around an inside of the extremity 935.

The stiffener 230 may be a semi-circular armature. The stiffener 230 may be made of a resilient material. The stiffener 230 may be adapted to surround at least one third of the human extremity 910 such that the human extremity 910 is located on a concave side 232 of the stiffener 230. In some embodiments, the stiffener 230 may be adapted to surround one half of the human extremity 910. As non-limiting examples, the stiffener 230 may be made from plastic or metal. The opposing ends of the stiffener 230 may be coupled to the ends of the flexible band 210. The center of the stiffener 230 may be coupled to the swivel bearing 400 such that the swivel bearing 400 is located on a convex side 234 of the stiffener 230.

The first grip pad 240 may be a non-slip pad lining the concave side 232 of the stiffener 230. The first grip pad 240 may prevent the stiffener 230 from sliding while in use. As non-limiting examples, the first grip pad 240 may be made from natural or synthetic rubber.

The flexible band 210 may be a length of flexible material that provides tension to hold the arm strap 200 on. The flexible band 210 may comprise a first flex band section 212 and a second flex band section 214. The end of the first flex band section 212 that is opposite the stiffener 230 may be coupled to the length adjuster 220. The end of the second flex band section 214 that is opposite the stiffener 230 may be coupled to a hook and loop fastener 250. The second flex band section 214 may be fastened to the first flex band section 212 to complete the flexible band 210 by passing the hook and loop fastener 250 on the second flex band section 214 through the length adjuster 220 on the first flex band section 212 and doubling the second flex band section 214 back on itself to join the hook and loop fastener 250.

The length adjuster 220 may be a loop that is permanently coupled to the first flex band section 212. The length adjuster 220 may serve as an attachment point for the second flex band section 214.

The beverage ring 300 may comprise an outer hoop 310. The beverage ring 300 may hold the beverage container 900 by passing the bottom of the beverage container 900 through the beverage ring 300 from the top.

The outer hoop 310 may be a circular armature of a rigid material. As non-limiting examples, the outer hoop 310 may be made from plastic or metal. The diameter of the outer hoop 310 may be such that the beverage container 900 may pass more than half way through the beverage ring 300 before being stopped by mechanical interference between the beverage container 900 and the beverage ring 300.

The outer hoop 310 may be oriented such that the outer hoop 310 may be rotated to lie in the same plane as the arm strap 200. This orientation and rotation is illustrated in FIG. 1. The outer hoop 310 may rotate about a swivel axis 410 that passes laterally through the center of the outer hoop 310, axially through the center of the swivel bearing 400, and laterally through the center of the arm strap 200.

In some embodiments, the beverage ring 300 may further comprise a second grip pad 315. The second grip pad 315 may be a non-slip pad lining the inside circumference of the outer hoop 310. The second grip pad 315 may prevent slipping or scratching of the beverage container 900. As non-limiting examples, the second grip pad 315 may be made from natural or synthetic rubber.

The swivel bearing 400 may comprise a first swivel bearing half 420, a second swivel bearing half 425, and a swivel axle 430. The first swivel bearing half 420 may be coupled to the arm strap 200. The second swivel bearing half 425 may be coupled to the beverage ring 300. The first swivel bearing half 420 and the second swivel bearing half 425 may meet at a slip plane 435 that allows the first swivel bearing half 420 and the second swivel bearing half 425 to rotate by sliding against each other. The swivel axle 430 may pass through the center of the first swivel bearing half 420 and through the center of the second swivel bearing half 425. The first swivel bearing half 420 and the second swivel bearing half 425 may each be free to rotate around the swivel axle 430. The ends of the swivel axle 430 may be coupled to the stiffener 230 and to the beverage ring 300. In some embodiments, the swivel axle 430 may be a rivet.

In use, the invention 100 is fastened to the human extremity 910 by placing the stiffener 230 or the first grip pad 240 against the outside of the extremity 930 and fastening the second flex band section 214 to the first flex band section 212. To do this, the hook and loop fastener 250 located on the second flex band section 214 is passed through the length adjuster 220 located on the first flex band section 212 and then doubled back onto the second flex band section 214. The beverage container 900 may be lowered into the beverage ring 300 until the weight of the beverage container 900 is supported by the beverage ring 300. As the human extremity 910 is moved, the beverage ring 300 may rotate to keep the beverage container 900 upright.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "axle" is a cylindrical shaft that is inserted through the center of an object such that the center axis of the object and the center axis of the axle are aligned and the object can rotate using the axle as an axis of rotation.

As used in this disclosure, a "bearing" is anything that holds a rotating or sliding shaft or tube. A bearing may guide a moving component, limit the motion of a moving component relative to a fixed component and/or reduce the friction between the moving component and the fixed component.

As used in this disclosure, "concave" is used to describe a surface that resembles the interior surface of a sphere or a portion thereof.

As used in this disclosure, "convex" is used to describe a surface that resembles the exterior surface of a sphere or a portion thereof.

As used herein, the words "couple", "couples", "coupled" or "coupling", refer to connecting, either directly or indirectly, and does not necessarily imply a mechanical connection.

As used in this disclosure, a "diameter" of an object is a straight line segment that passes through the center (or center axis) of an object. The line segment of the diameter is terminated at the perimeter or boundary of the object through which the line segment of the diameter runs.

As used in this disclosure, a "fastener" is a device that is used to join or affix two objects. Fasteners generally comprise a first element which is attached to the first object and a second element which is attached to the second object such that the first element and the second element join to affix the first object and the second object. Common fasteners include, but are not limited to, hooks, zippers, snaps, clips, ties, buttons, buckles, quick release buckles, or hook and loop fasteners.

As used in this disclosure, "flexible" refers to an object or material which will deform when a force is applied to it, which will not return to its original shape when the deforming force is removed, and which may not retain the deformed shape caused by the deforming force.

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, a "hook and loop fastener" is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface.

As used in this disclosure, the word "lateral" refers to the sides of an object or movement towards a side. Lateral directions are generally perpendicular to longitudinal directions. "Laterally" refers to movement in a lateral direction.

As used in this disclosure, "orientation" refers to the positioning and/or angular alignment of a first object relative to a second object or relative to a reference position or reference direction.

As used in this disclosure, "resilient" or "semi-rigid" refer to an object or material which will deform when a force is applied to it and which will return to its original shape when the deforming force is removed.

As used herein, "rigid" refers to an object or material which is inflexible. If a force is applied to a rigid object the rigid object does not bend or deform unless the force applied reaches the breaking point of the rigid object.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. A wrist worn cup holder comprising:
an arm strap, a beverage ring, and a swivel bearing;
wherein the wrist worn cup holder is adapted to attach to a human extremity via the arm strap and to hold a beverage container adjacent to the human extremity via the beverage ring;
wherein the beverage ring changes its orientation relative to the arm strap by rotating at the swivel bearing as the human extremity is moved such that the beverage container remains upright;
wherein the swivel bearing comprises a first swivel bearing half, a second swivel bearing half, and a swivel axle;
wherein the first swivel bearing half is coupled to the arm strap;
wherein the second swivel bearing half is coupled to the beverage ring;
wherein the first swivel bearing half and the second swivel bearing half meet at a slip plane that allows the first swivel bearing half and the second swivel bearing half to rotate by sliding against each other;
wherein the swivel axle passes through the center of the first swivel bearing half and through the center of the second swivel bearing half;
wherein the first swivel bearing half and the second swivel bearing half are each free to rotate around the swivel axle;
wherein the ends of the swivel axle are coupled to the stiffener and to the beverage ring.
2. The wrist worn cup holder according to claim 1
wherein the arm strap comprises a stiffener, a first grip pad, a flexible band, and a length adjuster;
wherein the arm strap is adapted to attach to the human extremity by placing the stiffener against an outside of the extremity and passing the flexible band around an inside of the extremity.
3. The wrist worn cup holder according to claim 2
wherein the stiffener is a semi-circular armature;
wherein the stiffener is made of a resilient material;
wherein the stiffener is adapted to surround at least one third of the human extremity such that the human extremity is located on a concave side of the stiffener.
4. The wrist worn cup holder according to claim 3
wherein the stiffener is adapted to surround one half of the human extremity.
5. The wrist worn cup holder according to claim 3
wherein the stiffener is made from plastic or metal.
6. The wrist worn cup holder according to claim 3
wherein the opposing ends of the stiffener are coupled to the ends of the flexible band;
wherein the center of the stiffener is coupled to the swivel bearing such that the swivel bearing is located on a convex side of the stiffener.
7. The wrist worn cup holder according to claim 6
wherein the first grip pad is a non-slip pad lining the concave side of the stiffener;
wherein the first grip pad prevents the stiffener from sliding while in use.
8. The wrist worn cup holder according to claim 7
wherein the first grip pad is made from natural or synthetic rubber.
9. The wrist worn cup holder according to claim 7
wherein the flexible band is a length of flexible material that provides tension to hold the arm strap on.
10. The wrist worn cup holder according to claim 9
wherein the flexible band comprises a first flex band section and a second flex band section;
wherein the end of the first flex band section that is opposite the stiffener is coupled to the length adjuster;

wherein the end of the second flex band section that is opposite the stiffener is coupled to a hook and loop fastener;

wherein the second flex band section is fastened to the first flex band section to complete the flexible band by passing the hook and loop fastener on the second flex band section through the length adjuster on the first flex band section and doubling the second flex band section back on itself to join the hook and loop fastener.

11. The wrist worn cup holder according to claim 10 wherein the length adjuster is a loop that is permanently coupled to the first flex band section;

wherein the length adjuster serves as an attachment point for the second flex band section.

12. The wrist worn cup holder according to claim 11 wherein the beverage ring comprises an outer hoop;

wherein the beverage ring holds the beverage container by passing the bottom of the beverage container through the beverage ring from the top.

13. The wrist worn cup holder according to claim 12 wherein the outer hoop is a circular armature of a rigid material.

14. The wrist worn cup holder according to claim 13 wherein the outer hoop is made from plastic or metal;

wherein the diameter of the outer hoop is such that the beverage container passes more than half way through the beverage ring before being stopped by mechanical interference between the beverage container and the beverage ring.

15. The wrist worn cup holder according to claim 14 wherein the outer hoop is oriented such that the outer hoop is rotated to lie in the same plane as the arm strap;

wherein the outer hoop rotates about a swivel axis that passes laterally through the center of the outer hoop, axially through the center of the swivel bearing, and laterally through the center of the arm strap.

16. The wrist worn cup holder according to claim 15 wherein the beverage ring further comprises a second grip pad;

wherein the second grip pad is a non-slip pad lining the inside circumference of the outer hoop;

wherein the second grip pad prevents slipping or scratching of the beverage container.

17. The wrist worn cup holder according to claim 16 wherein the second grip pad is made from natural or synthetic rubber.

18. The wrist worn cup holder according to claim 17 wherein the swivel axle is a rivet.

* * * * *